United States Patent
Polivka (10) Patent No.: US 12,401,288 B2
(45) Date of Patent: Aug. 26, 2025

(54) ENERGY TRANSFER ELEMENT INCLUDING A COMMUNICATION ELEMENT

(71) Applicant: POWER INTEGRATIONS, INC., San Jose, CA (US)

(72) Inventor: William M. Polivka, Campbell, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 584 days.

(21) Appl. No.: 17/620,057

(22) PCT Filed: Aug. 17, 2020

(86) PCT No.: PCT/US2020/046617
§ 371 (c)(1),
(2) Date: Dec. 16, 2021

(87) PCT Pub. No.: WO2021/034745
PCT Pub. Date: Feb. 25, 2021

(65) Prior Publication Data
US 2022/0311345 A1    Sep. 29, 2022

Related U.S. Application Data

(60) Provisional application No. 62/888,089, filed on Aug. 16, 2019.

(51) Int. Cl.
*H02M 3/335* (2006.01)
*H01F 27/30* (2006.01)

(52) U.S. Cl.
CPC ...... *H02M 3/33553* (2013.01); *H01F 27/306* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 3,226,639 A * 12/1965 McAdam ............... G01R 33/02
                                                     318/653
3,403,323 A    9/1968 Kent
(Continued)

FOREIGN PATENT DOCUMENTS

CN    1154721 A    7/1997
CN    2453528 Y   10/2001
(Continued)

OTHER PUBLICATIONS

Esser A: "Contactless Charging and Communication for Electric Vehicles", vol. 1, No. 6, Nov. 1, 1995 (Nov. 1, 1995), 1077-2618, figures 1,2; 8 pages.
(Continued)

*Primary Examiner* — Sean Kayes
*Assistant Examiner* — Nusrat Quddus (57) ABSTRACT

An energy transfer element that provides galvanic isolation in a power controller is disclosed herein. A magnetic core assembly has an aperture. A first power winding is positioned within the magnetic core assembly. A first communication winding and a second communication winding are positioned within the aperture such that both the first and second communication windings are perpendicular to the first power winding. The magnetic flux density produced by current in the first power winding is perpendicular to the magnetic flux density produced by current in the first communication winding and the second communication winding. For a power controller having an input-referenced controller and an output-referenced controller, the energy (Continued)

transfer element provides galvanic isolation between the controllers because the communication windings are electrically insulated from each other and from the magnetic core assembly.

17 Claims, 8 Drawing Sheets

(58) Field of Classification Search
CPC .............. H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/32; H02M 2001/322; H02M 2001/327; H02M 1/34; H02M 2001/342; H02M 2001/344; H02M 2001/346; H02M 2001/348; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; Y02B 70/1491; H02J 3/46; H02J 3/38; H02J 3/1878; H01F 29/00; H01F 29/02; H01F 29/025; H01F 29/04; G05F 1/10; G05F 1/12; G05F 1/14; G05F 1/147; G05F 1/153; G05F 1/16; G05F 1/20; G05F 1/22; G05F 1/24; G05F 1/247; G05F 1/253; G05F 1/26; G05F 1/30; H01H 9/0005; H02H 7/055; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17
See application file for complete search history.

(56) References Cited

U.S. PATENT DOCUMENTS

| | | | | |
|---|---|---|---|---|
| 3,739,257 A * | 6/1973 | Hunter | ................. | G05F 1/13 323/248 |
| 4,020,440 A * | 4/1977 | Moerman | ............. | H02H 9/021 336/155 |
| 4,103,221 A | 7/1978 | Fukui et al. | | |
| 4,206,434 A * | 6/1980 | Hase | ............... | H01F 21/08 336/215 |
| 4,277,751 A | 7/1981 | Lawson et al. | | |
| 4,295,838 A | 10/1981 | Richards et al. | | |
| 4,307,334 A * | 12/1981 | Peil | .................... | H02M 3/3381 363/133 |
| 4,439,822 A | 3/1984 | Cocconi | | |
| 4,459,653 A * | 7/1984 | Smith | ................ | H05B 41/2822 315/276 |
| 4,583,156 A * | 4/1986 | Forge | .................. | H02M 3/3382 323/253 |
| 4,791,542 A | 12/1988 | Piaskowski | | |
| 4,853,668 A * | 8/1989 | Bloom | .................. | H01F 27/255 336/170 |
| 4,994,952 A * | 2/1991 | Silva | ....................... | H01F 29/14 174/DIG. 17 |
| 5,166,597 A | 11/1992 | Larsen et al. | | |
| 5,317,300 A * | 5/1994 | Boesel | .................. | H01F 41/005 29/609 |
| 5,440,225 A | 8/1995 | Kojima | | |
| 5,446,346 A * | 8/1995 | Nilssen | ................ | H05B 41/245 315/219 |
| 5,534,837 A * | 7/1996 | Brandt | .................... | H01F 21/08 336/83 |
| 5,737,203 A * | 4/1998 | Barrett | .............. | H02M 3/33561 363/75 |
| 5,757,184 A | 5/1998 | Kurihara et al. | | |
| 6,194,897 B1 | 2/2001 | Fukunaga | | |
| 6,208,531 B1 | 3/2001 | Vinciarelli et al. | | |
| 6,370,043 B1 | 4/2002 | Yasumura | | |
| 6,380,735 B1 | 4/2002 | Kawakami | | |
| 6,490,180 B2 * | 12/2002 | Hiltunen | .................. | H01F 30/10 363/21.16 |
| 6,639,499 B2 | 10/2003 | Okita et al. | | |
| 7,646,281 B2 | 1/2010 | Diekmann et al. | | |
| 8,253,299 B1 * | 8/2012 | Rittenhouse | ............. | B62M 6/90 310/257 |
| 8,610,533 B2 * | 12/2013 | Nussbaum | .......... | H02M 3/1584 336/221 |
| 2003/0020428 A1 | 1/2003 | Masaki et al. | | |
| 2003/0052671 A1 | 3/2003 | Kawase | | |
| 2009/0230776 A1 * | 9/2009 | Ochi | ....................... | H01F 27/38 29/605 |
| 2009/0322165 A1 | 12/2009 | Rittenhouse | | |
| 2010/0085138 A1 | 4/2010 | Vail | | |
| 2010/0195353 A1 | 8/2010 | Nishiyama et al. | | |
| 2011/0032683 A1 * | 2/2011 | Li | ..................... | H02M 3/33592 361/760 |
| 2012/0257421 A1 | 10/2012 | Brkovic | | |
| 2013/0320940 A1 | 12/2013 | Dimitrovski | | |
| 2014/0185337 A1 * | 7/2014 | Espino | ................... | H01F 27/36 363/21.17 |
| 2014/0218012 A1 * | 8/2014 | Umetani | ................ | G01R 33/02 324/117 R |
| 2015/0008757 A1 | 1/2015 | Scholz et al. | | |
| 2016/0358705 A1 | 12/2016 | Lin et al. | | |
| 2021/0313895 A1 | 10/2021 | Schaible | | |
| 2022/0311324 A1 | 9/2022 | Sato et al. | | |

FOREIGN PATENT DOCUMENTS

| | | |
|---|---|---|
| CN | 103460309 A | 12/2013 |
| CN | 106405260 A | 2/2017 |
| DE | 102013009587 A1 | 12/2013 |
| GB | 2042277 A | 9/1980 |
| JP | H07130554 A | 5/1995 |
| JP | 2005191256 A | 7/2005 |
| JP | 2010027946 A | 2/2010 |
| JP | 2017098415 A | 6/2017 |
| RU | 2168230 C2 | 5/2001 |
| WO | 2014061113 A1 | 4/2014 |
| WO | 2018158339 A1 | 9/2018 |

OTHER PUBLICATIONS

PCT Application No. PCT/US2020/046612; International Search Report and Written Opinion of the International Searching Authority; Oct. 28, 2020; 11 pages.

(56) References Cited

OTHER PUBLICATIONS

PCT Application No. PCT/US2020/046617; International Search Report and Written Opinion of the International Searching Authority; Oct. 30, 2020; 9 pages.

PCT Application No. PCT/US2020/046621; International Search Report and Written Opinion of the International Searching Authority; Nov. 20, 2020; 16 pages.

Sonja Klopper et al: "A Sensor for Balancing Flux in Converters with a High-Frequency Transformer Link", vol. 33, No. 3, Jun. 1, 1997; 6 pages.

Machine Translation of DE102013009587; Klopcic Beno, et al., "Measuring device for detecting saturation of magnetic core of transformer in direct current static converter", 6 pages.

Machine Translation of JP2010027946; Sakita Koichi, "Magnetic Core", 7 pages.

U.S. Appl. No. 17/622,178, Non-Final Office Action mailed Nov. 29, 2024; 9 pages.

Chinese Application Serial No. 202080056726.0, First Office Action and Search Report with Machine Translation, Aug. 29, 2024, 16 pages.

Chinese Patent Application No. 202080056816.X; "First Office Action, Search Report with Machine Translation"; mailed Nov. 11, 2024, 10 pages.

PCT Application Serial No. PCT/US2020/046612, International Preliminary Report on Patentability, issued Feb. 17, 2022, 7 pages.

PCT Application Serial No. PCT/US2020/046617, International Preliminary Report on Patentability, issued Feb. 17, 2022, 6 pages.

PCT Application Serial No. PCT/US2020/046621, International Preliminary Report on Patentability, issued Feb. 17, 2022, 12 pages.

U.S. Appl. No. 17/619,903, Non-Final Office Action mailed Jan. 22, 2025; 16 pages.

Chinese Application Serial No. 202080056726.0, Second Office Action Issued Feb. 25, 2025, and Search Report 1 Dated Feb. 22, 2025, with Machine Translation, 17 pages in all.

U.S. Appl. No. 17/619,903; "Notice of Allowance Mailed Apr. 23, 2025"; 17 pages.

Chinese Application Serial No. 202080056805.1, First Office Action Issued Jan. 15, 2025, and Search Report Dated Jan. 13, 2025, with Machine Translation, 10 pages in all.

E. Osegueda, K. D. T. Ngo, W. M. Polivka and M. M. Walters, "Perforated-plate magnetics. I. Mode-1 inductor/transformer," in IEEE Transactions on Aerospace and Electronic Systems, vol. 31, No. 3, pp. 968-976, Jul. 1995.

Polivka, William M. (1984) Applications of Magnetics to Problems in Switched-Mode Power Conversion. Dissertation (Ph.D.), California Institute of Technology. doi: 10.7907/31G4-8128. https://resolver.caltech.edu/CaltechETD: etd-01022007-112439.

S. Kirli, K. D. T. Ngo, W. M. Polivka and M. M. Walters, "Inductance modeling for a mode-2 perforated-plate matrix inductor/transformer," Proceedings of IEEE Power Electronics Specialist Conference—PESC '93, Seattle, WA, USA, 1993, pp. 1130-1136.

S. Kirli, K. D. T. Ngo, W. M. Polivka and M. M. Walters, "Perforated-plate magnetics. II. Mode-2 inductor/transformer," in IEEE Transactions on Aerospace and Electronic Systems, vol. 31, No. 3, pp. 977-986, Jul. 1995.

W. M. Polivka, et al., "Detection of Magnetic Saturation in Switching Converters," in Proc. Power Convers. Int. Conf., Mar. 1982, pp. 584-597. Also, in Advances in Switched-Mode Power Conversion, vol. III, Pasadena, CA: TESLAco, 1983, pp. 103-118.

W. Polivka, A. Cocconi, and S. Cuk, "Use of Orthogonal Flux to Detect Impending Magnetic Saturation in Switching Converters, " Advances in Switched-Mode Power Conversion, vol. III, Pasadena, CA: TESLAco, 1983, pp. 119-149.

CN Application No. 202080056726.0; "Decision on Rejection with Machine Translation"; mailed Jun. 30, 2025; 15 pages.

* cited by examiner

ENERGY TRANSFER ELEMENT INCLUDING A COMMUNICATION ELEMENT

This application is a National Stage Entry of International Application No. PCT/US2020/046617 filed on Aug. 17, 2020, which claims the benefit of U.S. Provisional Application No. 62/888,089, filed Aug. 16, 2019, the contents of which are incorporated in their entirety herein by reference.

RELATED APPLICATIONS

This patent application is related to patent application 62/888,194, "Core Assemblies for Magnetic Saturation Detector without Requirement for DC Bias" and to patent application 62/887,810, entitled, "Magnetic Saturation Detector with Single and Multiple Transverse Windings," each of which is filed on even date herewith, each of which is assigned to the common assignee, and each of which has one common inventor. Each of the Related Applications is incorporated herein by reference in its entirety.

BACKGROUND OF THE INVENTION

1. Field of the Invention

The disclosure describes an apparatus for communication and the transfer of energy between galvanically isolated circuits. The apparatus transfers energy from an input to a galvanically isolated output. The communication may be between galvanically isolated circuits. The communication is independent of the voltages and currents that are involved in the energy transfer.

2. Discussion of the Related Art

In a switch-mode power supply (SMPS) that provides galvanic isolation between an input and an output, there is typically a magnetic energy transfer element that has one or more input windings and one or more output windings. The input windings are galvanically isolated from the output windings, and circuits that are referenced to a return node on the input are galvanically isolated from circuits that are referenced to a return node on the output. In other words, a dc voltage applied between an input winding and an output winding would produce negligible current. Similarly, a dc voltage applied between a node of any circuit on the input and a node of any circuit on the output would produce negligible current. The SMPS may have a first controller referenced to the input and a second controller referenced to the output. The two controllers may communicate with each other during the operation of the power supply. For example, a request for circuits on the input to provide more power may originate from the control circuit referenced to the output. In another example, an input-referenced controller may receive feedback information from an output-referenced error amplifier about the state of the output that is to be regulated.

Furthermore, it may be desirable to communicate "housekeeping" data (e.g., device temperature, device identification and/or power levels etc.) from the input-referenced controller to the output-referenced controller or vice versa. Further still, it may be desirable to communicate information across the isolation barrier that separates the input circuits from the output circuits of an SMPS in either direction. The communication could be of analog or digital format.

Typically, isolation in a communication interface of an SMPS is provided using one or more communication transformer, capacitive coupler, or optocoupler. Utilizing such isolation devices and the associated components, however, generally increases the number of components and the overall cost of the SMPS. There is a need to provide communication between galvanically isolated circuits SMPS without increasing the number of components.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
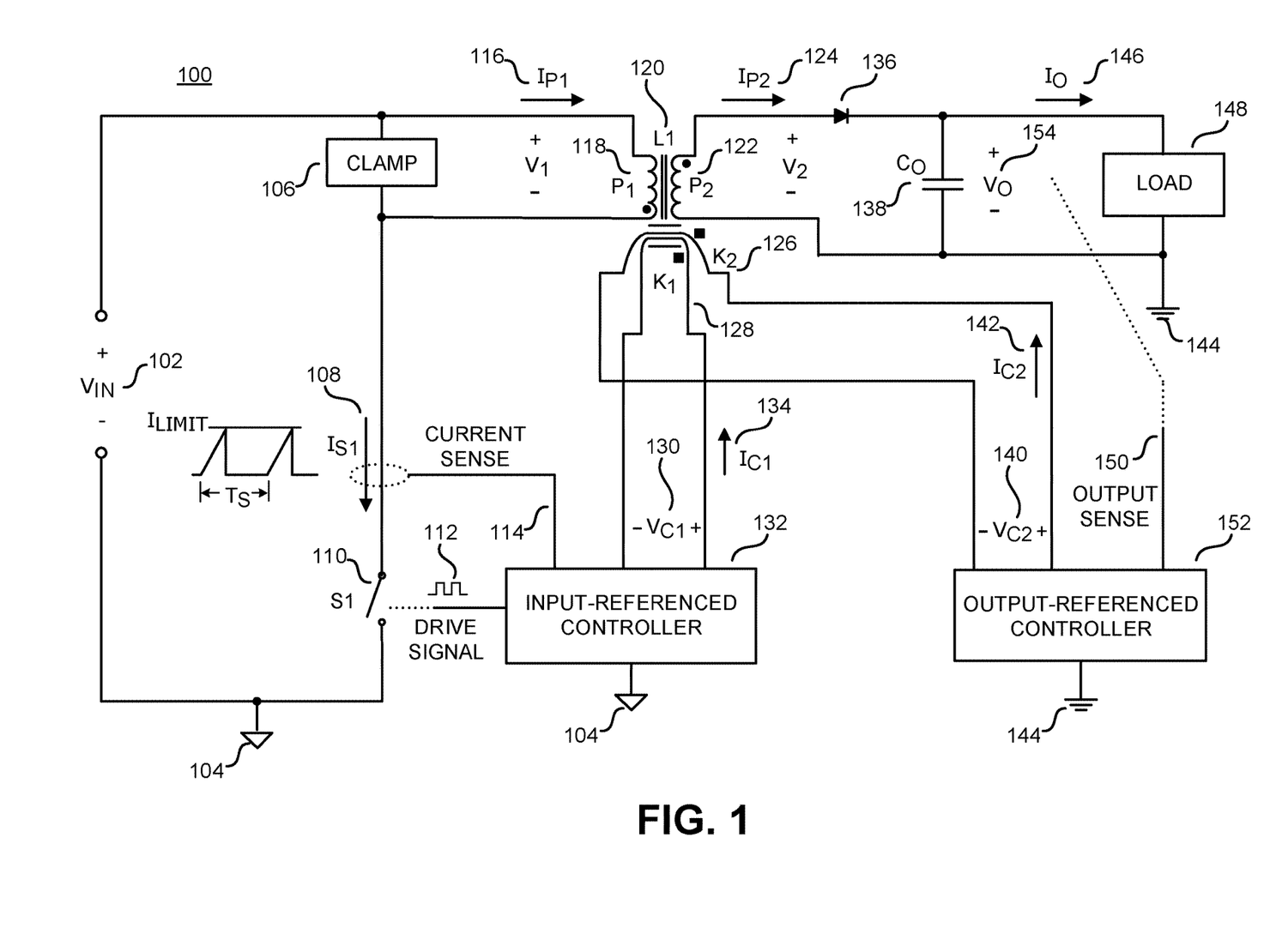
FIG. 1 illustrates one example of a power supply with an energy transfer element that includes a first communication winding and a second communication winding used for communication between an input-referenced controller and an output-referenced controller, according to some embodiments.

FIG. 1 is a schematic diagram 100 of an example power supply configured to operate with an energy transfer element that includes a communication element. The example power supply of FIG. 1 receives an input voltage $V_{IN}$ 102 with respect to an input return 104 and provides a regulated output to a load 148. The regulated output may be a voltage $V_O$ 154 with respect to an output return 144, a current $I_O$ 146, or a combination of both.

The example power supply of FIG. 1 uses a flyback power converter to produce an output that is galvanically isolated from the input. In other words, a voltage applied between the input return 104 and the output return 144 would produce negligible current. The flyback power converter in the example power supply of FIG. 1 includes an energy transfer element L1 120 that has an input power winding $P_1$ 118, output power winding $P_2$ 122, a first communication winding $K_1$ 128 and a second communication winding $K_2$ 126. Power windings $P_1$ 118 and $P_2$ 122 take part principally in the transfer of energy between the input and the output, whereas communication windings $K_1$ 128 and $K_2$ 126 take part principally in communication between the input-referenced controller and the output-referenced controller. In the example power supply of FIG. 1, an input-referenced controller 132 and an output-referenced controller 152 send and receive signals between galvanically isolated returns 104 and 144. Input-referenced controller 132 may send and receive signals with communication winding 128 as either a voltage $V_{C1}$ 130 or a current $I_{C1}$ 134. Output-referenced controller 152 may send and receive signals with communication winding 126 as either a voltage $V_{C2}$ 140 or a current $I_{C2}$ 142.

The symbol in FIG. 1 that represents energy transfer element L1 120 uses the dot convention to represent voltage polarities on windings. The circular dots on power windings $P_1$ 118 and $P_2$ 122 indicate that the ends of the power windings with the dots have the same voltage polarity with respect to the end of the same winding without the dot. For example, if the dotted end of one power winding is positive with respect to the non-dotted end, the dotted ends of all power windings are positive with respect to their non-dotted ends. Similarly, the square dots on communication windings $K_1$ 128 and $K_2$ 126 indicate that the ends of the communication windings with the dots have the same voltage polarity with respect to the end of the same communication winding without a dot. The dots on the power windings have a different shape than the dots on the communication windings to indicate that the polarity of a power winding is not necessarily the polarity of a communication winding, as will become apparent from the description of the construction of energy transfer element L1 120 later in this disclosure.

A clamp circuit 106 is coupled across the input power winding $P_1$ 118. An input switch S1 110 is coupled between the input power winding $P_1$ 118 and the input return 104.

In operation, an input-referenced controller 132 receives signals from an output-referenced controller 152 through galvanically isolated communication windings $K_1$ 128 and $K_2$ 126 included in energy transfer element L1 120 to produce a drive signal 112 that opens and closes the input switch S1 110. An open switch cannot conduct current, whereas a closed switch may conduct current. The input-referenced controller 132 senses current $I_{S1}$ 108 in the input switch S1 110 as a current sense signal 114. In one mode of operation, input-referenced controller 132 may open input switch S1 110 when the current $I_{S1}$ 108 reaches a threshold value.

The switching of switch S1 110 produces pulsating currents $I_{P1}$ 116 and $I_{P2}$ 124 in the respective power windings $P_1$ 118 and $P_2$ 122 of energy transfer element L1 120, as well as pulsating voltages $V_1$ and $V_2$ across those respective windings. Clamp circuit 106 prevents excess voltage on input power switch S1 110 when the switch opens. Output winding current $I_{P2}$ 124 from output power winding P2 122 is rectified by diode 136 and filtered by output capacitor $C_O$ 138 to produce an output voltage $V_O$ 154 and an output current $I_O$ 146 at a load 148. Either the output voltage $V_O$ 154, the output current $I_O$ 146, or a combination of both may be sensed as an output sense signal 150 by the output-referenced controller 152. The output-referenced controller compares the sensed output quantity to a reference value, and communicates with the input-referenced controller 132 through galvanically-isolated communication windings $K_1$ 128 and $K_2$ 126 to switch the input switch S1 110 appropriately to obtain the desired output values.

Figure 2:
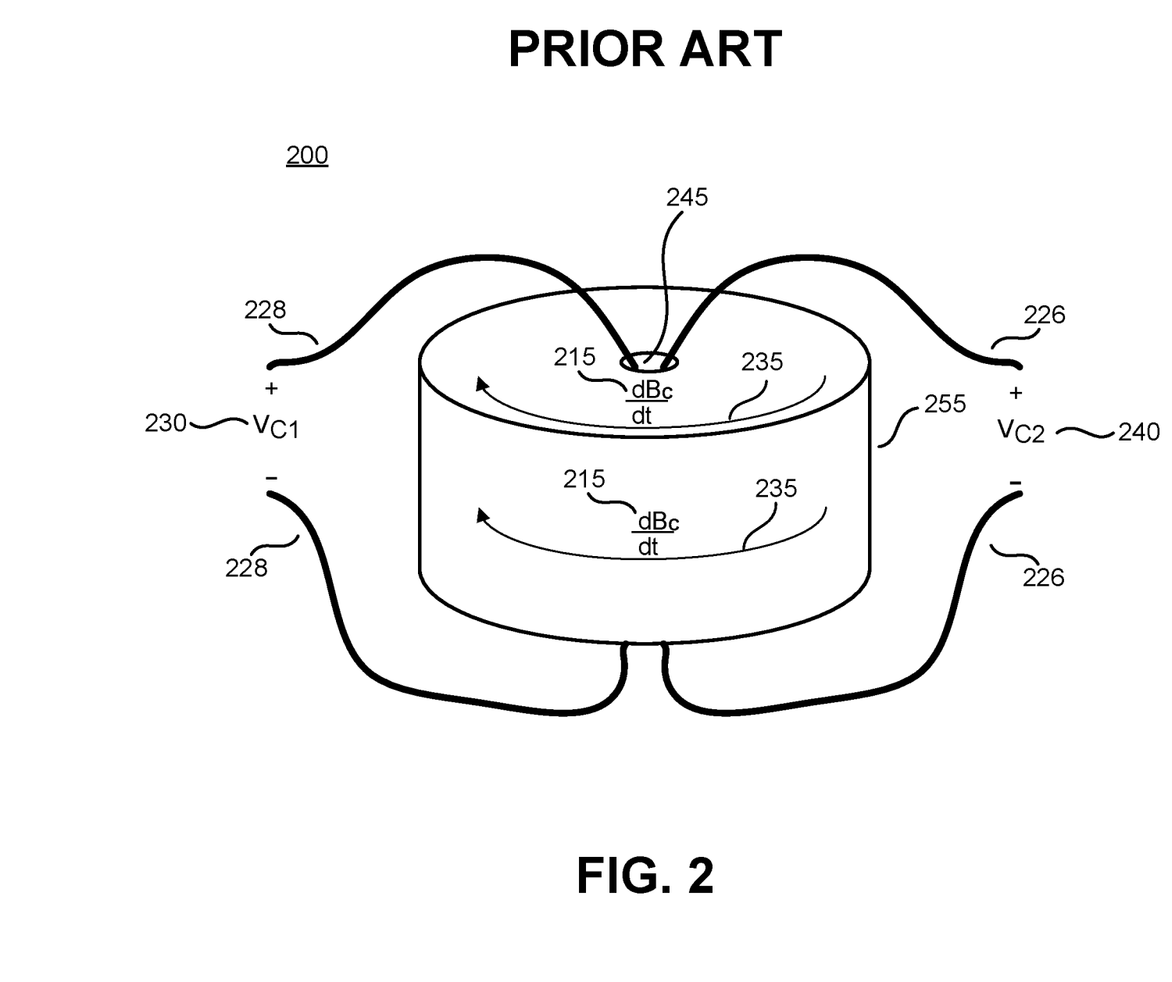
FIG. 2 illustrates a signal transformer with flux density path in a first direction.

FIG. 2 illustrates a signal transformer constructed from a toroid of magnetic material 255. A first communication winding 228 and a second communication winding 226 pass through an aperture 245 in the center of the toroid. The windings are electrically insulated from the core and from each other so that they are galvanically isolated. A magnetic flux density $B_C$ that passes through the area defined by the loops of each winding is established in a direction 235 that is perpendicular to the axis of the aperture 245 in response to voltages on the communication windings 226 and 228. A voltage applied to one winding produces a rate of change $dB_C/dt$ 215 of flux density $B_C$ that produces a voltage in the other winding. The ratio of the two voltages is approximately the same as the ratio of the number of turns of their respective windings. In the example of FIG. 2, each winding has a single turn, so voltage $V_{C1}$ 230 is approximately the same as voltage $V_{C2}$ 240. Thus, galvanically isolated circuits may communicate through the galvanically isolated windings 226 and 228 by transmitting and receiving voltages on communication windings. Similarly, voltages on the windings may produce currents in the windings that circuits may interpret as communication signals.

Figure 3A:
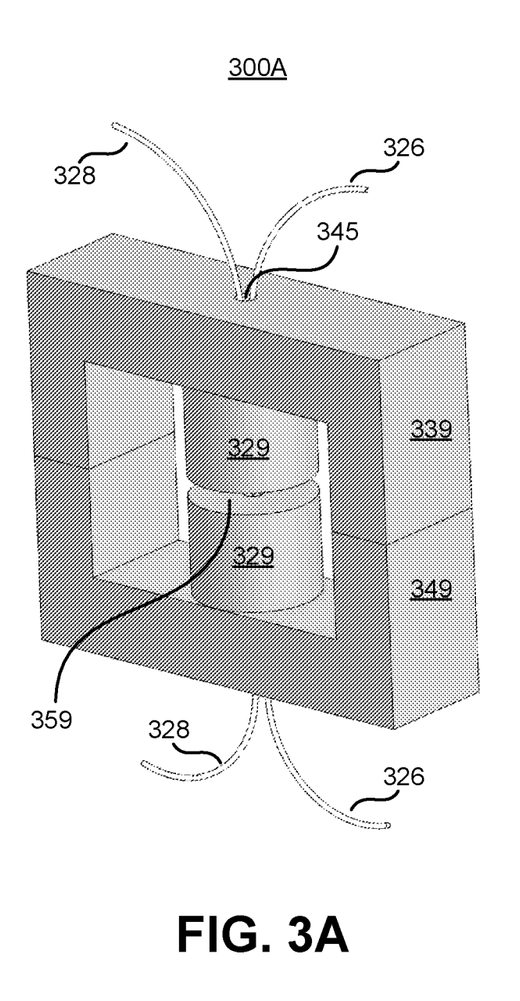
FIG. 3A illustrates one view of a magnetic core that includes a signal transformer that has a first communication winding, and a second communication winding, according to some embodiments.

FIG. 3A illustrates a perspective view 300A of a magnetic core assembly that includes a signal transformer with a first communication winding 328 and a second communication winding 326. The assembly in FIG. 3A includes an upper core piece, e.g. upper core-half 339, and a lower core piece, e.g. a lower core-half 349, each having a round cylindrical section that forms a center post 329. The assembly also includes a gap 359 in the center post 329. An aperture 326 passes through the center post 329 in each core-half to form a toroid similar to the toroid of the signal transformer of FIG. 2. Communication windings 328 and 326 pass through the apertures in each core-half of FIG. 3A to form a signal transformer within the center post of the assembly.

It will be appreciated by those skilled in the art that magnetic assemblies and parts of magnetic assemblies may be described by various terms that are not necessarily technically accurate nor precise. For example, virtually any piece of magnetic material may be referred to as a magnetic core. A complete assembly of pieces of magnetic components exclusive of windings may also typically be referred to as a magnetic core. Assemblies of magnetic cores typically comprise two core pieces. In many assemblies of magnetic cores, such as in the example of FIG. 3A, the two core pieces may be nearly identical. Hence, each core piece may be commonly referred to as a core member or core-half. In practice, the gap in a center post, such as the gap 359 in the assembly of FIG. 3A for example, may be formed by removing material from the center post of only one of two identical core-halves. Each core piece is still referred to as a core-half even though the piece that forms the gap is no longer identical to the piece that had no material removed. The assembly may be further referred to as a core pair. In this disclosure the term core-half may be used to refer to one of two nearly identical pieces in an assembly to distinguish the assembly from alternative assemblies comprising pieces that are obviously not identical. For example, an assembly of two E-shaped pieces may have the same geometrical features and magnetic properties as an assembly that uses one E-shaped piece with one I-shaped piece. The EE assembly comprises two core-halves whereas the EI assembly does not, although each assembly comprises two core members. It is noted that in the practice of the art each one of a magnetic core piece, a magnetic core member, a magnetic core element, a magnetic core-half, and a magnetic core assembly may be referred to as a magnetic core.

Figure 3B:
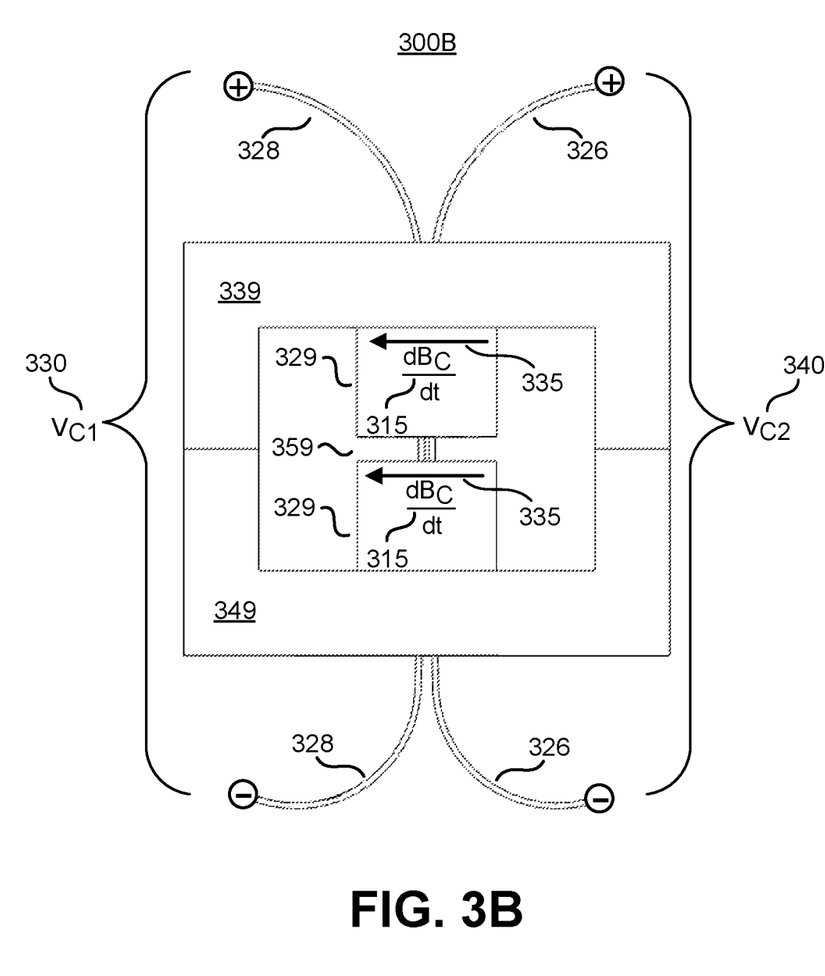
FIG. 3B illustrates the magnetic core of FIG. 3A that includes the first communication winding, a second communication winding, and a flux density path in a first direction, according to some embodiments.

FIG. 3B is a front view 300B of the magnetic core assembly of FIG. 3A showing voltage $V_{C1}$ across first communication winding 328 and voltage $V_{C2}$ across second communication winding 326 that produces a changing flux density 315 in a direction 335 that is perpendicular to the axis of the aperture. FIG. 3B further illustrates that the flux density produced by a communication winding is essentially confined to the magnetic material that surrounds the aperture in the center of the structure. In other words, the parts of the core-halves that extend radially beyond the center post have negligible flux density from the communication windings.

Figure 4A:
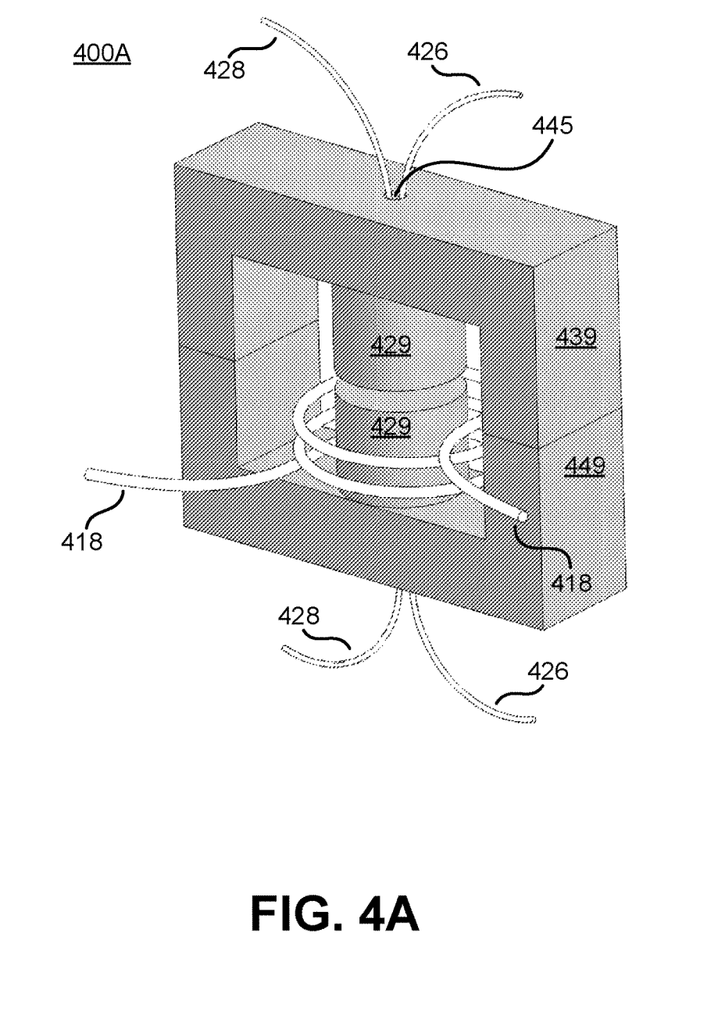
FIG. 4A illustrates a magnetic core as shown in FIG. 3A and FIG. 3B that includes first communication winding, a second communication winding, and a power winding for energy transfer, according to some embodiments.

FIG. 4A is perspective view 400A of a magnetic core as shown in FIG. 3A and FIG. 3B that includes a first communication winding 428, a second communication winding 426, and a power winding 418. Power winding 418 is representative of one or more windings that take part in storing or transferring energy, such as for example $P_1$ 118 and $P_2$ 122 in the energy transfer element L1 120 in the power supply of FIG. 1. In a practical component, the turns of the power windings are typically placed on a separate spool, sometimes referred to as a bobbin or a coil former, that would fit over the center posts to facilitate assembly. The communication windings then may be threaded through the aperture. Since the communication windings 426 and 428 are perpendicular to the turns of the power winding, and cores intended for energy transfer elements are typically optimized to hold power windings, the communication windings may be referred to as transverse windings, descriptive of their physical orientation with respect to the power windings of traditional cores. It is appreciated that a transverse winding need not be geometrically perpendicular to the power windings. Any conductor that passes completely through a turn of a power winding in one direction at any angle may be a transverse winding. Ordinary cores for use in power supplies typically do not have an aperture 445 to accommodate communication windings. Energy transfer elements will typically have a gap 359 in the center post of assembled core-halves as shown in FIG. 3A to set electrical parameters that correspond to the desired amount of stored energy.

Figure 4B:
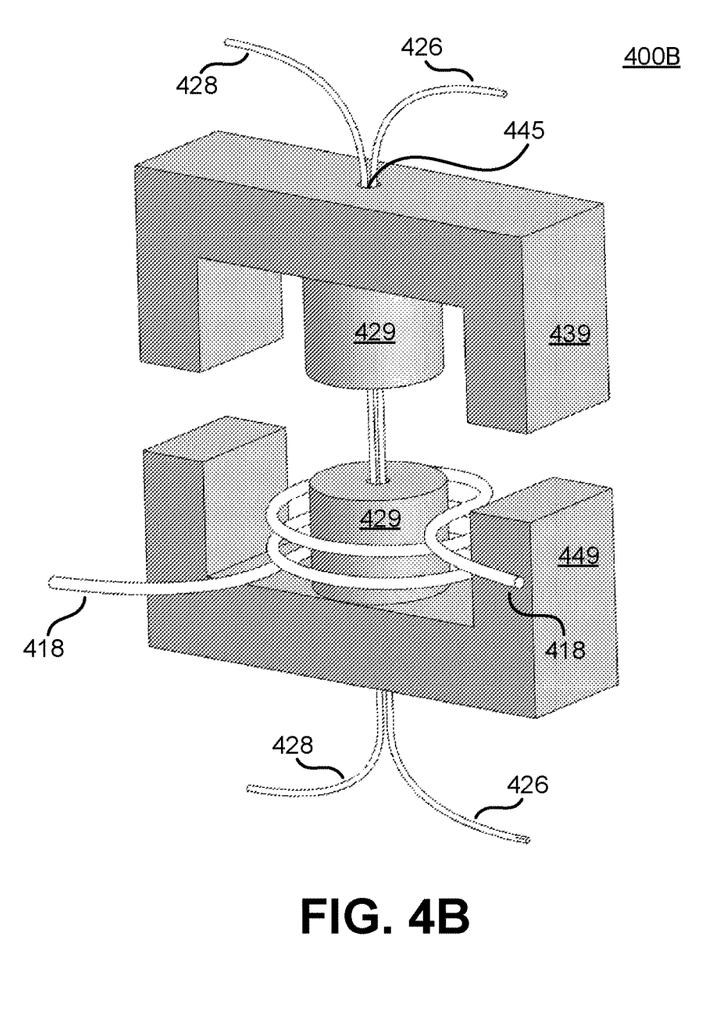
FIG. 4B illustrates an exploded view of the magnetic core shown in FIG. 4A to illustrate the placement of the first communication winding, the second communication winding, and a power winding for energy transfer, according to some embodiments.

FIG. 4B illustrates a perspective view 400B of the magnetic core shown in FIG. 4A with the upper core-half 439 and lower core-half 449 separated to show the transverse communication windings 426 and 428 passing through the aperture in the lower core-half 448.

Figure 5:
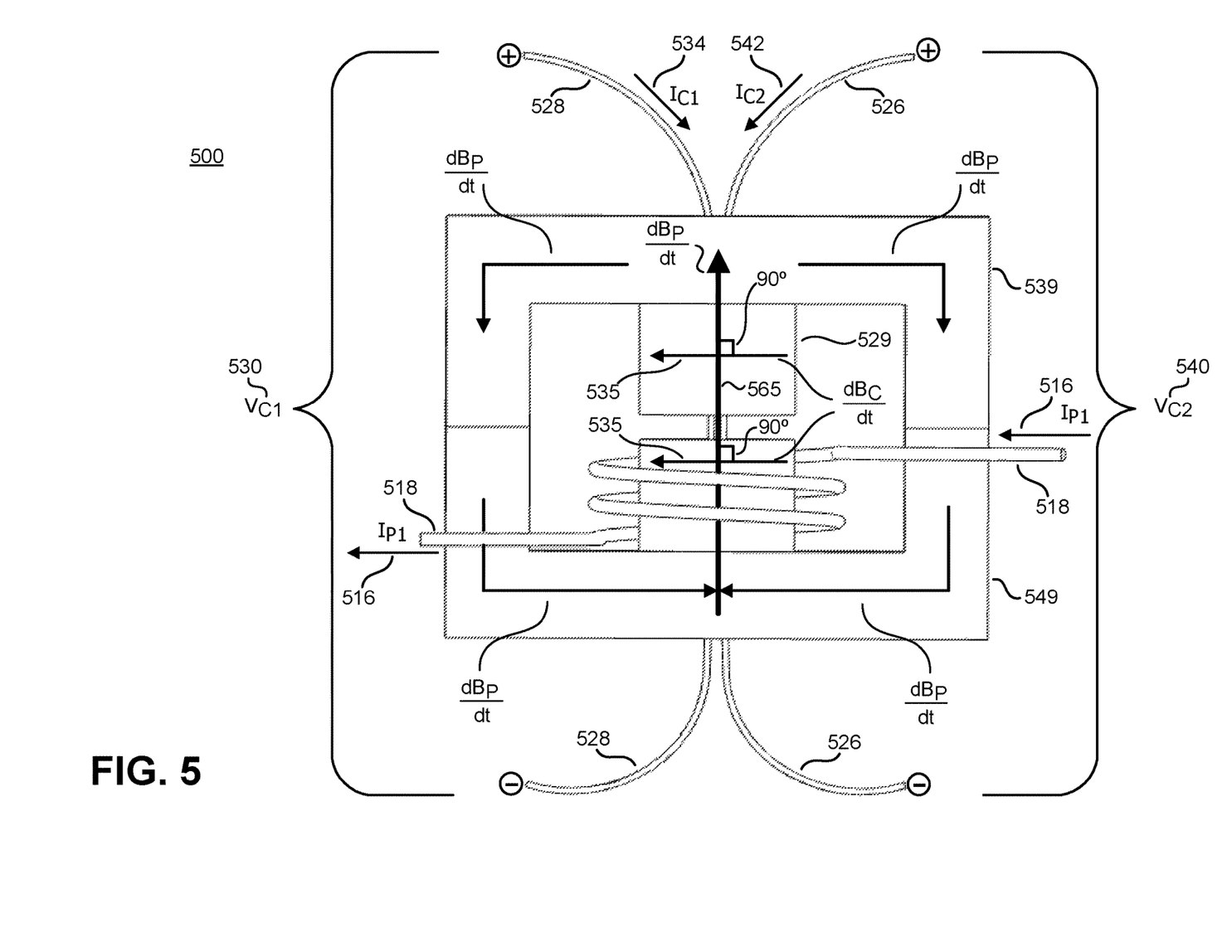
FIG. 5 illustrates a magnetic core as shown in FIGS. 3 and 4 to illustrate a flux density path of the communication signals and a flux density path of the energy transfer signals, according to some embodiments.

FIG. 5 is a front view 500 of the magnetic core assembly of FIG. 4A that illustrates directions and paths of flux densities. The drawing shows currents $I_{C1}$ 534 and $I_{C2}$ 542 in respective communication windings 528 and 526 that produce flux density $B_C$ 535 in the center post 529 of upper core-half 539 and lower core-half 549. The direction of the flux density $B_C$ 535 is perpendicular to the axis of the aperture in the center post 529. A rate of change $dB_C/dt$ of the magnitude of flux density $B_C$ 535 is proportional to the voltages $V_{C1}$ 530 and $V_{C2}$ 540 across the respective communication windings 528 and 526.

The drawing of FIG. 5 also shows turns of a power winding 518 encircling center post 529. Current $I_{P1}$ 516 in power winding 518 produces flux density $B_P$ 565 in the center post 529. In the center post 529, flux density $B_P$ 565 that is produced by the power winding 518 is perpendicular to flux density $B_C$ 535 that is produced by communication windings 528 and 526. In other words, the drawing of FIG. 5 shows that the angle between the directions of the flux densities $B_C$ 535 and $B_P$ 565 in the center post 529 is a right angle of 90 degrees. FIG. 5 shows that when a current is passed through the power winding a first magnetic flux density $B_P$ 565 is produced in the magnetic core assembly, and when a current (either $I_{C1}$ 518 or $I_{C2}$ 542) is passed through a communication winding (528 or 526 respectively) a second magnetic flux density $B_C$ 535 is produced in the magnetic core assembly such that the first magnetic flux density $B_P$ 565 is perpendicular to the second magnetic flux density $B_C$ 535.

When the energy transfer element operates in its linear region where the magnitude of the flux density has negligible influence on the properties of the magnetic material of the core, flux densities $B_P$ 565 and $B_C$ 535 have negligible influence on each other. Therefore, a rate of change $dB_P/dt$ of the magnitude of flux density $B_P$ 565 in center post 529 does not produce significant voltage on communication windings 528 and 526. Conversely, a rate of change $dB_C/dt$ of the magnitude of flux density $B_C$ 535 in center post 529 does not produce significant voltage on power winding 518.

FIG. 5 shows that power winding flux density $B_P$ 565 in the center post divides into two approximately equal parts in the horizontal and outer vertical portions of the core as it traverses closed paths between the upper and lower core-halves. Although the portion of power winding flux density $B_P$ 565 in the horizontal sections of the core-halves is not everywhere perpendicular to communication winding flux density $B_C$ 535, any contribution to voltage on the communication windings in the top core-half 539 is cancelled exactly by the opposite contribution in the bottom core-half 549, so the net contribution to voltage in the communication windings from a power winding is zero. In other words, the flux density of the communication signal and the flux density of the energy transfer signals are oriented by the geometry of the energy transfer element such that voltages and currents that take part in communication are independent of voltages and currents that take part in transfer of energy.

It is not necessary for the communication windings to pass through an aperture in the center post to realize the benefits of the invention. The communication windings can pass through an aperture at any other place in the magnetic core that will place flux density from communication windings perpendicular to flux density from power windings. For example, the aperture that positions the communication windings in the center post of the structure in FIG. 5 may be moved into one of the vertical portions of the structure either to the left or to the right of the center post. In practice, it is usually preferable to use the center post for the communication windings because the center post typically has substantially more magnetic material than other parts of the core, providing higher inductance that is desirable for the circuits that drive the communication windings.

The flux densities $B_C$ 535 and $B_P$ 565 sum as vectors in the magnetic material. In practical applications it is typically desirable to have vector sum of the flux densities less a threshold value that marks the boundary between the linear region and the onset of magnetic saturation. The magnetic core may be shared effectively between communication and energy transfer by timing the signaling intervals to occur when the flux density from the power winding is relatively low.

Figure 6:
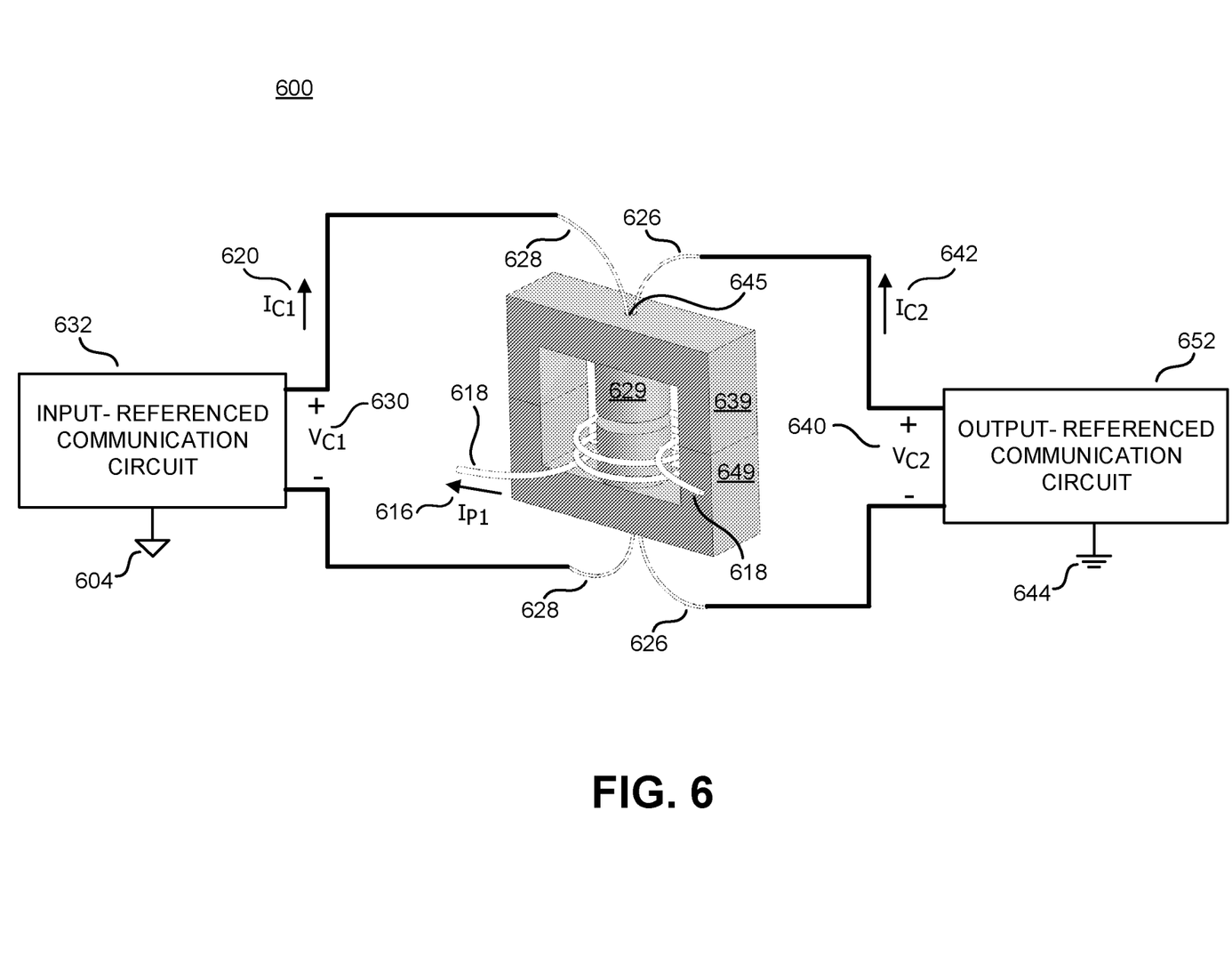
FIG. 6 illustrates a magnetic core with a power winding for energy transfer, a first communication winding coupled to an input-referenced communication circuit, and a second communication winding coupled to an output-referenced communication circuit, according to some embodiments.

FIG. 6 is a connection diagram 600 that shows a perspective view of an example energy transfer element as it might be applied in the example power supply of FIG. 1. Some mechanical details have been omitted to avoid obscuring the invention. The energy transfer element in FIG. 6 includes an upper core-half 639 and a lower core-half 649, each having a center post 629. A power winding 618 encircles the center post 629 and conducts a current $I_{P1}$ 616. Communication windings 628 and 626 pass through an aperture 645 in the center post of both core-halves. An input-referenced communication circuit 632 and an output-referenced communication circuit 652 send and receive signals between galvanically isolated returns 604 and 644. Input-referenced communication circuit 632 may send and receive signals with communication winding 628 as either a voltage $V_{C1}$ 630 or a current $I_{C1}$ 620. Output-referenced communication circuit 652 may send and receive signals with communication winding 626 as either a voltage $V_{C2}$ 640 or a current $I_{C2}$ 642.

Figure 7:
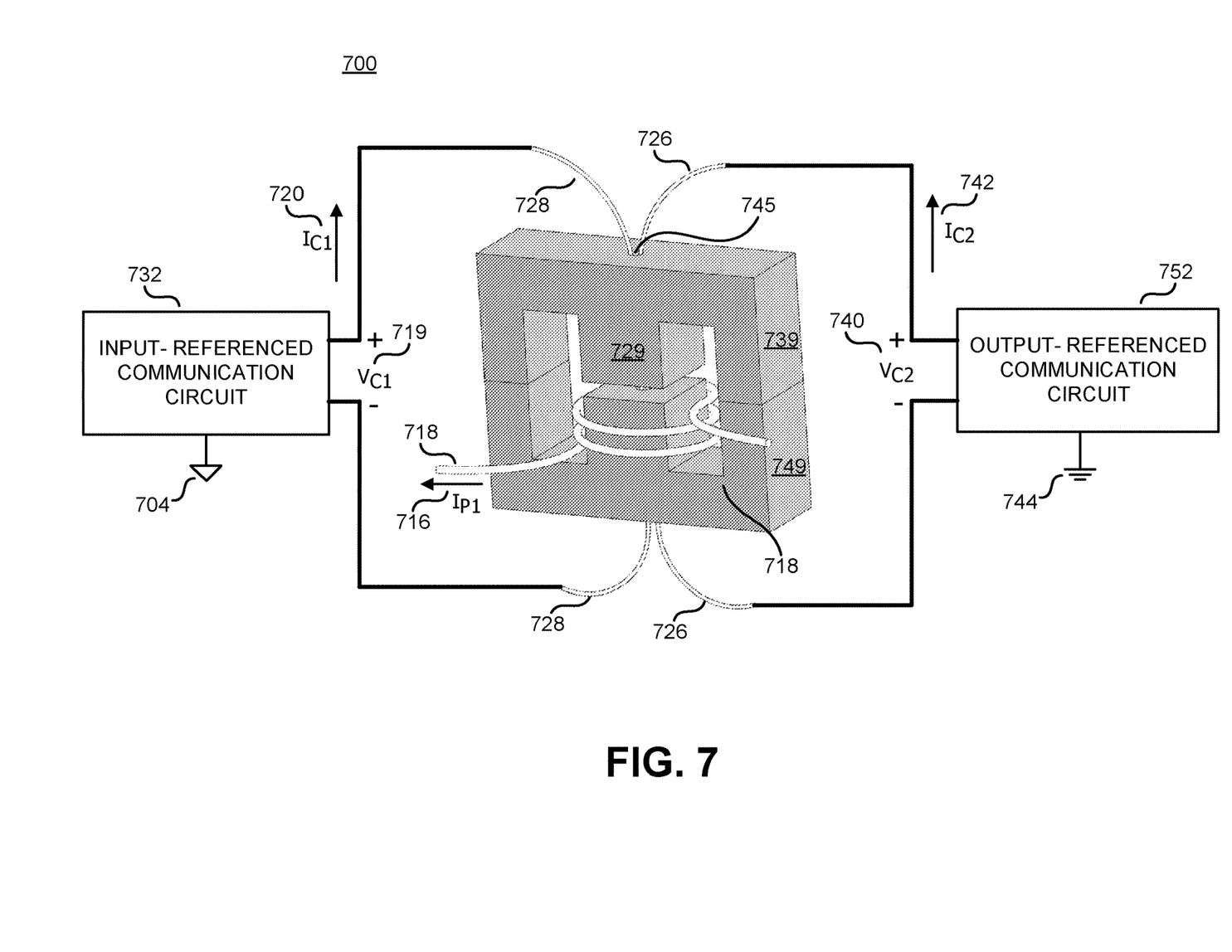
FIG. 7 illustrates an EE magnetic core with a power winding for energy transfer, a first communication winding coupled to an input-referenced communication circuit, and a second communication winding coupled to an output-referenced communication circuit, according to some embodiments.

FIG. 7 is a connection diagram 700 that shows a perspective view of modified EE core-halves configured as an example energy transfer element as it might be applied in the example power supply of FIG. 1. The assemblies of energy transfer elements in previous drawings were presented as generic examples to show the salient features of the construction of energy transfer elements that include communication windings in an aperture transverse to traditional power windings. The example energy transfer element in FIG. 7 is constructed from two standard EE-style ferrite core-halves, an upper core-half 739 and a lower core-half 749. A hole 726 must be drilled in the center post of each standard core-half to make the aperture for communication windings 728 and 726. An example power winding 718 is shown encircling a center post 729 and conducting current $I_{P1}$ 716.

An input-referenced communication circuit 732 and an output-referenced communication circuit 752 send and receive signals between galvanically isolated returns 704 and 744. Input-referenced communication circuit 732 may send and receive signals with communication winding 728 as either a voltage $V_{C1}$ 730 or a current $I_{C1}$ 720. Output-referenced communication circuit 752 may send and receive signals with communication winding 726 as either a voltage $V_{C2}$ 740 or a current $I_{C2}$ 742.

Figure 8:
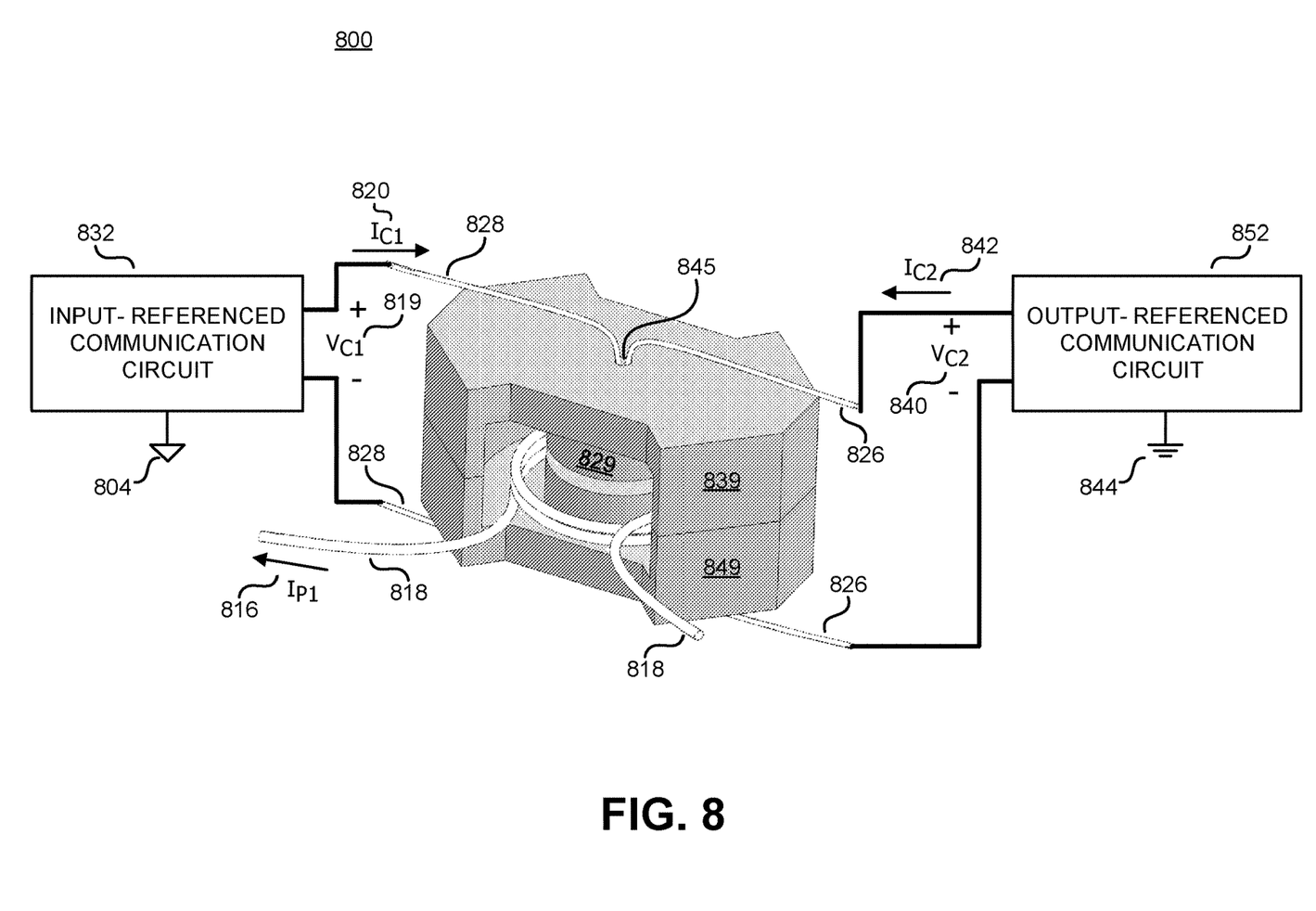
FIG. 8 illustrates a low-profile RM magnetic core with a power winding for energy transfer, a first communication winding coupled to an input-referenced communication circuit, and a second communication winding coupled to an output-referenced communication circuit, according to some embodiments.

FIG. 8 is a connection diagram 800 that shows a perspective view of an example energy transfer element constructed from two standard RM-style ferrite core-halves, an upper core-half 839 and a lower core-half 849 as it might be applied in the example power supply of FIG. 1. A hole 845 in the center of the center post of each core-half is an off-the-self option that is intended to accommodate a ferrite slug to adjust the inductance of the power winding after assembly. Communication windings 828 and 826 may traverse the adjustment hole in place of the ferrite slug to make an integrated signal transformer in accordance with the teaching of this invention. Other styles of ferrite cores may have apertures for other purposes such for assembly hardware that may be suitable for communication windings. In cores that do not come with a suitable aperture, a hole may be drilled through the center post.

An input-referenced communication circuit 832 and an output-referenced communication circuit 852 send and receive signals between galvanically isolated returns 804 and 844. Input-referenced communication circuit 832 may send and receive signals with communication winding 828 as either a voltage $V_{C1}$ 830 or a current $I_{C1}$ 820. Output-referenced communication circuit 852 may send and receive signals with communication winding 826 as either a voltage $V_{C2}$ 840 or a current $I_{C2}$ 842.

Although the drawings in this disclosure show examples of core assemblies that use identical upper and lower core-halves, other standard structures such as for example EI assemblies that have non-identical upper and lower core pieces may be modified with a hole drilled through the E-piece and the I-piece to form an aperture through a center post. Moreover, it will be apparent to those skilled in the art that the core assembly may include more than two pieces to make equivalent structures.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1: An energy transfer element comprising: a magnetic core assembly having an aperture; a first power winding positioned within the magnetic core assembly; and a first communication winding and a second communication winding, positioned within the aperture such that both the first and second communication windings are perpendicular to the first power winding, wherein when a current is passed through the power winding a first magnetic flux density is produced in the magnetic core assembly, and when a current is passed through a communication winding a second magnetic flux density is produced in the magnetic core assembly such that the first magnetic flux density is perpendicular to the second magnetic flux density.

Example 2: The energy transfer element of example 1, the magnetic core assembly further comprising: a lower core piece having a center section; and an upper core piece having a center section aligned with the lower core piece such that the center section of the lower core piece and the center section of the upper core piece form a center post, wherein the center post having the aperture through the center post, and wherein the first and the second communication windings pass through the aperture.

Example 3: The energy transfer element of example 2, wherein the lower core piece comprises a lower core-half and the upper core piece comprises an upper core-half.

Example 4: The energy transfer element of example 1, further comprising: a second power winding, wherein the first power winding is an input power winding and the second power winding is an output power winding.

Example 5: A controller comprising: an energy transfer element comprising, a magnetic core assembly having an aperture; a first power winding positioned within the magnetic core assembly; a first communication winding and a second communication winding, positioned within the aperture such that both the first and second communication windings are perpendicular to the first power winding, wherein when a current is passed through the power winding a first magnetic flux density is produced in the magnetic core assembly and when a current is passed through a communication winding a second magnetic flux density is produced in the magnetic core assembly such that the first magnetic flux density is perpendicular to the second magnetic flux density; an output-referenced communication circuit, coupled across the second communication winding, and configured to sense an output sense signal, compare the output sense signal to a reference value and generate a switching signal; and an input-referenced communication circuit coupled across the first communication winding and configured to produce a drive signal, wherein the first and second communication windings transmit communication signals.

Example 6: The controller of example 5, the magnetic core assembly further comprising: a lower core piece having a center section; and an upper core piece having a center section, aligned with the lower core piece such that the center section of the lower core piece and the center section of the upper core piece form a center post, wherein the center post has the aperture through the center post, and wherein the first and the second communication windings pass through the aperture.

Example 7: The controller of example 6, wherein the lower core piece comprises a lower core-half, and the upper core piece comprises an upper core-half.

Example 8: The controller of example 5, the magnetic core assembly further comprising: a second power winding, wherein the first power winding is an input power winding and the second power winding is an output power winding.

Example 9: The controller of example 8, further comprising galvanic isolation interposing the input-referenced communication circuit and the output-referenced communication circuit.

Example 10: The controller of example 9, wherein the first and second communication windings are electrically insulated from each other and from the magnetic core assembly, and the electrical insulation comprises the galvanic isolation.

Example 11: The controller of example 9, wherein the communication signals are between the input-referenced communication circuit and the output-referenced communication circuit.

Example 12: The controller of example 11, wherein the communication signals are selected from a group comprising voltage and current signals.

Example 13: The controller of example 5, wherein the energy transfer element is included in a power converter.

Example 14: The controller of example 13, wherein the power converter is a flyback converter.

Example 15: The controller of example 14, the flyback converter further comprising: galvanic isolation interposing the input-referenced communication circuit and the output-referenced communication circuit.

Example 16: The controller of example 14, the flyback converter further comprising the first and second communication windings being electrically insulated from each other and the magnetic core assembly, wherein the electrical insulation comprises the galvanic isolation.

Example 17: The controller of example 16, wherein the communication signals are between the input-referenced communication circuit and the output-referenced communication circuit.

Example 18: The controller of example 17, wherein the communication signals are selected from a group comprising voltage and current signals.

What is claimed is:

1. An energy transfer element comprising:
   a magnetic core assembly having an aperture and comprising:
      a lower core piece having a center section; and
      an upper core piece having a center section aligned with the lower core piece such that the center section of the lower core piece and the center section of the upper core piece form a center post, and wherein the center post has the aperture through the center post;
   a first power winding positioned within the magnetic core assembly; and
   a first communication winding and a second communication winding, positioned within the aperture such that both the first and second communication windings are perpendicular to the first power winding and pass through the aperture, wherein when a first current is passed through the first power winding a first magnetic flux density is produced in the magnetic core assembly, and when a second current is passed through the first communication winding a second magnetic flux density is produced in the magnetic core assembly such that the first magnetic flux density is perpendicular to the second magnetic flux density.

2. The energy transfer element of claim 1, wherein the lower core piece comprises a lower core-half and the upper core piece comprises an upper core-half.

3. The energy transfer element of claim 1, further comprising:
a second power winding, wherein the first power winding is an input power winding and the second power winding is an output power winding.

4. A controller comprising:
an energy transfer element comprising,
a magnetic core assembly having an aperture;
a first power winding positioned within the magnetic core assembly;
a first communication winding and a second communication winding, positioned within the aperture such that both the first and second communication windings are perpendicular to the first power winding,
wherein when a first current is passed through the first power winding a first magnetic flux density is produced in the magnetic core assembly and when a second current is passed through the first communication winding a second magnetic flux density is produced in the magnetic core assembly such that the first magnetic flux density is perpendicular to the second magnetic flux density;
an output-referenced communication circuit, coupled across the second communication winding, and configured to sense an output sense signal, compare the output sense signal to a reference value and generate a switching signal; and
an input-referenced communication circuit coupled across the first communication winding and configured to produce a drive signal,
wherein the first and second communication windings transmit communication signals.

5. The controller of claim 4, the magnetic core assembly further comprising:
a lower core piece having a center section; and
an upper core piece having a center section, aligned with the lower core piece such that the center section of the lower core piece and the center section of the upper core piece form a center post,
wherein the center post has the aperture through the center post, and
wherein the first and the second communication windings pass through the aperture.

6. The controller of claim 5, wherein the lower core piece comprises a lower core-half, and the upper core piece comprises an upper core-half.

7. The controller of claim 4, the magnetic core assembly further comprising:
a second power winding,
wherein the first power winding is an input power winding and the second power winding is an output power winding.

8. The controller of claim 7, further comprising galvanic isolation interposing the input-referenced communication circuit and the output-referenced communication circuit.

9. The controller of claim 8, wherein the first and second communication windings are electrically insulated from each other and from the magnetic core assembly with electrical insulation, wherein the electrical insulation comprises the galvanic isolation.

10. The controller of claim 8, wherein the communication signals are between the input-referenced communication circuit and the output-referenced communication circuit.

11. The controller of claim 10, wherein the communication signals are selected from a group comprising voltage and current signals.

12. The controller of claim 4, wherein the energy transfer element is included in a power converter.

13. The controller of claim 12, wherein the power converter is a flyback converter.

14. The controller of claim 13, the flyback converter further comprising:
galvanic isolation interposing the input-referenced communication circuit and the output-referenced communication circuit.

15. The controller of claim 14, the flyback converter further comprising the first and second communication windings being electrically insulated from each other and the magnetic core assembly with electrical insulation, wherein the electrical insulation comprises the galvanic isolation.

16. The controller of claim 15, wherein the communication signals are between the input-referenced communication circuit and the output-referenced communication circuit.

17. The controller of claim 16, wherein the communication signals are selected from a group comprising voltage and current signals.

* * * * *